United States Patent
Biedrzycki et al.

(10) Patent No.: US 8,267,562 B2
(45) Date of Patent: Sep. 18, 2012

(54) MULTI-POLE CIRCUIT BREAKER LIGHT GUIDE TRIP INDICATOR AND INSTALLATION METHOD

(75) Inventors: Timothy Biedrzycki, Powder Springs, GA (US); Russell T. Watford, Lawrenceville, GA (US); Brian Timothy McCoy, Lawrenceville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 206 days.

(21) Appl. No.: 12/723,848

(22) Filed: Mar. 15, 2010

(65) Prior Publication Data
US 2010/0236909 A1     Sep. 23, 2010

Related U.S. Application Data

(60) Provisional application No. 61/161,169, filed on Mar. 18, 2009.

(51) Int. Cl.
  F21V 7/04     (2006.01)
  F21V 33/00    (2006.01)
  H01H 9/00     (2006.01)
  G08B 21/00    (2006.01)
  G02B 6/00     (2006.01)

(52) U.S. Cl. .......... 362/602; 362/95; 200/310; 340/625; 385/139

(58) Field of Classification Search ............ 362/602, 362/95; 200/310; 385/139; 340/628
See application file for complete search history.

(56) References Cited

U.S. PATENT DOCUMENTS

| | | | | |
|---|---|---|---|---|
| 4,935,856 A | * | 6/1990 | Dragoon | 362/307 |
| 5,327,328 A | * | 7/1994 | Simms et al. | 362/26 |
| 5,481,440 A | * | 1/1996 | Oldham et al. | 362/555 |
| 5,515,244 A | * | 5/1996 | Levins et al. | 362/551 |
| 5,760,754 A | * | 6/1998 | Amero et al. | 345/82 |
| 5,938,324 A | * | 8/1999 | Salmon et al. | 362/555 |
| 5,986,860 A | | 11/1999 | Scott | |
| 5,988,842 A | * | 11/1999 | Johnsen et al. | 362/551 |
| 6,463,204 B1 | * | 10/2002 | Ati | 385/147 |
| 6,623,152 B1 | * | 9/2003 | Kroening | 362/555 |
| 6,969,186 B2 | * | 11/2005 | Sonderegger et al. | 362/551 |
| 7,393,127 B1 | * | 7/2008 | Ho | 362/551 |
| 7,586,718 B1 | | 9/2009 | Radosavljevic | |
| 2001/0000767 A1 | | 5/2001 | Arai | |
| 2003/0001699 A1 | | 1/2003 | Brown | |
| 2006/0139858 A1 | * | 6/2006 | Lewis et al. | 361/627 |
| 2006/0226852 A1 | | 10/2006 | Bradley | |
| 2008/0106832 A1 | | 5/2008 | Kinsel | |
| 2008/0137361 A1 | | 6/2008 | Ho | |
| 2008/0204947 A1 | | 8/2008 | Parker | |
| 2009/0198459 A1 | | 8/2009 | Bilac | |

* cited by examiner

Primary Examiner — David J Makiya

(57) ABSTRACT

An apparatus, method and system for visually indicating a circuit breaker, such as a multi-pole circuit breaker, has been tripped are provided. An exemplary light guide comprises a plurality of light conduits adapted to transmit light from two or more light sources within a circuit breaker assembly to an exterior of the circuit breaker assembly; a beam that connects the light conduits; and one or more retention features coupled to one or more of the light conduits, wherein each retention feature is adapted to mate with a retention feature interface of the circuit breaker assembly. Numerous other aspects are provided.

18 Claims, 8 Drawing Sheets

"PRIOR ART"

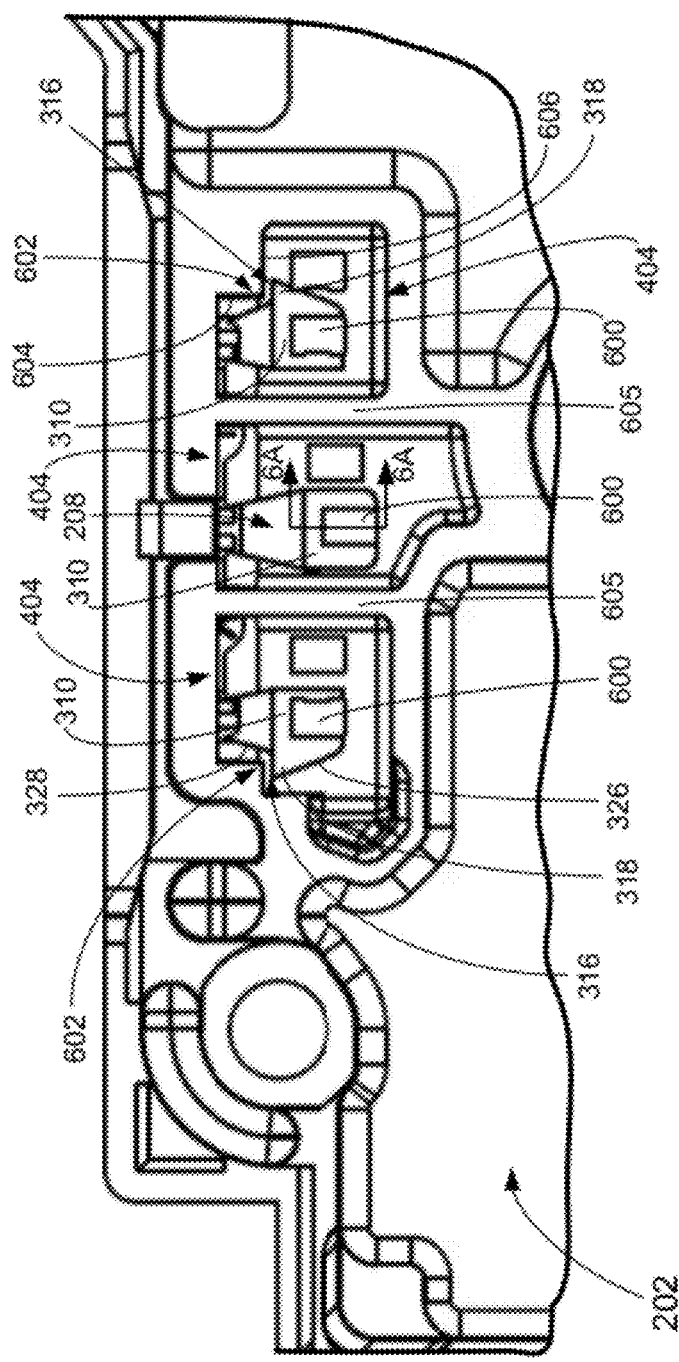
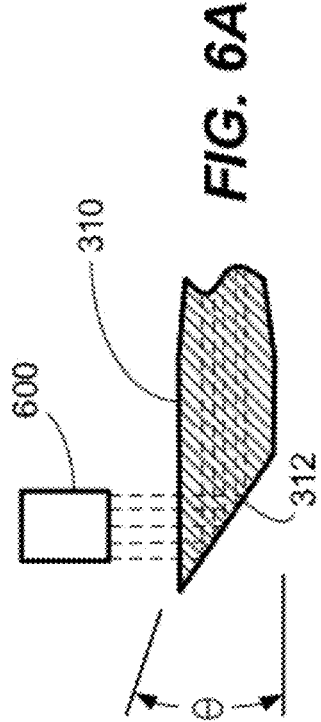
FIG. 6
FIG. 6A

MULTI-POLE CIRCUIT BREAKER LIGHT GUIDE TRIP INDICATOR AND INSTALLATION METHOD

The present application claims priority to U.S. Provisional Patent Application Ser. No. 61/161,169, entitled "CAFCI 2P LIGHT GUIDE TRIP INDICATOR" filed Mar. 18, 2009, which is hereby incorporated by reference herein in its entirety.

FIELD OF THE INVENTION

The present invention relates to the field of fault detection in electrical circuits, and more specifically, to apparatus and methods for visually indicating a multi-pole circuit breaker has been tripped.

BACKGROUND

The electrical systems in residential, commercial and industrial applications usually include a panel board for receiving electrical power from a utility source. The power is then routed through protection devices to designated branch circuits supplying one or more loads. These protection devices are typically circuit interrupters such as circuit breakers and fuses, which are designed to interrupt the electrical current if predetermined limits of the conductors are surpassed or if other predefined fault conditions are detected on one of the protected lines or branches. In other words, circuit breakers are used to protect electrical circuitry from damage due to an overcurrent condition, such as an overload condition or a relatively high level short circuit or fault condition (e.g., a ground fault or arc fault condition).

An arcing fault is commonly defined as an electric current, often strong, brief, and luminous, in which electrons (or the current) jump across a gap in a circuit or between two electrodes. For example, lightning is a case of an electric arc between one cloud and the earth or another cloud, as are sparks caused by discharges of static electricity. There are many conditions that may cause an arcing fault. For example, corroded, worn or aging wiring, contacts, connectors or insulation, loose connections, wiring damaged by nails or staples through the insulation, and electrical stress caused by repeated overloading, lightning strikes, etc.

An Arc Fault Circuit Interrupter (AFCI) is a circuit breaker designed to trip, for example, by detecting a non-intended electrical arc and to disconnect power quickly upon detecting the arc. The AFCI device may distinguish between a working arc that may occur in the brushes of a vacuum cleaner, light switch, or other household devices, for example, and a non-working arc that can occur, for instance, in a lamp cord that has a broken conductor in the cord from overuse, for example. The AFCI device may be adapted for use in any residential and/or commercial power system environment and may be configured to detect arc faults, including both line-fault (e.g., parallel-type arcing between lines) and contact-fault (e.g., series-type arcing on the same line due to electrical discontinuity in the conductor) that may be present on a power circuit associated with the power system.

Some types of conventional circuit breakers do not include an arc fault indicator. As such, these circuit breakers do not provide any feedback to the customer or technician of what type of tripping condition has occurred in the system. Other types of conventional circuit breakers may include a mechanical arc fault indicator, such as a trip flag, for example, to indicate if an arc fault has been generated. A problem with the mechanical arc fault indicator is, for example, that variations in manufacturing may cause reliability issues for this type of system. For example, the technician may be led to a false diagnosis of the problem, leading to considerable effort to repair the problem. Mechanical indicators may typically be less cost effective and may be prone to a failure due to parts binding, missing, or being worn out. Other types of conventional circuit breakers may include a visual arc fault indicator for outputting status, health, and/or fault information associated with the circuit breaker. However, these visual arc fault indicators typically require high manufacturing tolerance requirements in terms of the mating features to hold the visual display in place within the circuit breaker. As such, these features need to be monitored frequently in production to ensure a quality product. Accordingly, a need exists for an improved method and apparatus for visually indicating a multi-pole circuit breaker has tripped.

SUMMARY OF THE INVENTION

In an aspect of the invention, a light guide is provided. The light guide includes a plurality of light conduits adapted to transmit light from two or more light sources within a circuit breaker assembly to an exterior of the circuit breaker assembly; a beam that connects the light conduits; and one or more retention features coupled to one or more of the light conduits, wherein each retention feature is adapted to mate with a retention feature interface of the circuit breaker assembly.

In another aspect of the invention, a light guide is provided. The light guide includes two or more light conduits adapted to transmit light from two or more light sources within a circuit breaker assembly to an exterior of the circuit breaker assembly; a beam adapted to connect the light conduits; one or more retention features adapted to mate with a retention feature interface of the circuit breaker assembly; wherein each light conduit has a first end and a second end; a light dispersion pad coupled to the first end of each of the light conduits; and wherein a cross sectional area of the light dispersion pad is larger than a cross section of the beam.

In yet another aspect of the invention, a method for coupling a light guide to a circuit breaker assembly is provided. The method includes providing a light guide having two or more light conduits connected by a beam, wherein each of the conduits includes a retention feature; drawing the retention features toward each other such that the beam is flexed; positioning the light guide in a retention feature interface of a circuit breaker assembly; and releasing the drawn retention features such that the beam straightens and the light guide retention features mate with the retention feature interface of the circuit breaker assembly.

In still another aspect of the invention, a circuit breaker assembly is provided. The circuit breaker assembly includes a housing adapted to house fault detection circuits; and a light guide coupled to two or more light sources within the housing and adapted to indicate the circuit breaker assembly has been tripped, wherein the light guide includes: two or more light conduits adapted to transmit light from the two or more light sources within the housing to a an exterior of the housing; a beam adapted to connect the two or more light conduits; and two or more retention features coupled to each of the light conduits, wherein each of the retention features is adapted to mate with a retention feature interface of the housing.

Other features and aspects of the present invention will become more fully apparent from the following detailed description, the appended claims, and the accompanying drawings.

BRIEF DESCRIPTION OF THE DRAWINGS

FIG. 6 is an enlarged partial schematic view of the area within the circle of FIG. 5B in accordance with some embodiments of the present invention.

FIG. 6A is a partial cross-sectional view of the light source and light capture pad taken along the line 6A-6A in FIG. 6.

DETAILED DESCRIPTION

The present invention provides apparatus, systems and methods for visually indicating a circuit breaker has tripped, and, more specifically, that a multi-pole circuit breaker, such as a combination type arc fault circuit interrupter (CAFCI), has been tripped. In particular, the present invention may provide a light guide to transmit light from a light source coupled to a printed circuit board (PCB) inside a circuit breaker to a position that can be easily viewed by a customer or technician, whereby the light guide may have lower manufacturing tolerance requirements compared to conventional visual arc fault indicators. In another aspect, the light guide may provide a higher intensity indication compared to a conventional visual arc fault indicator. In some embodiments, the light guide of the present invention may be installed securely within a circuit breaker using integral retention features.

Figure 1:
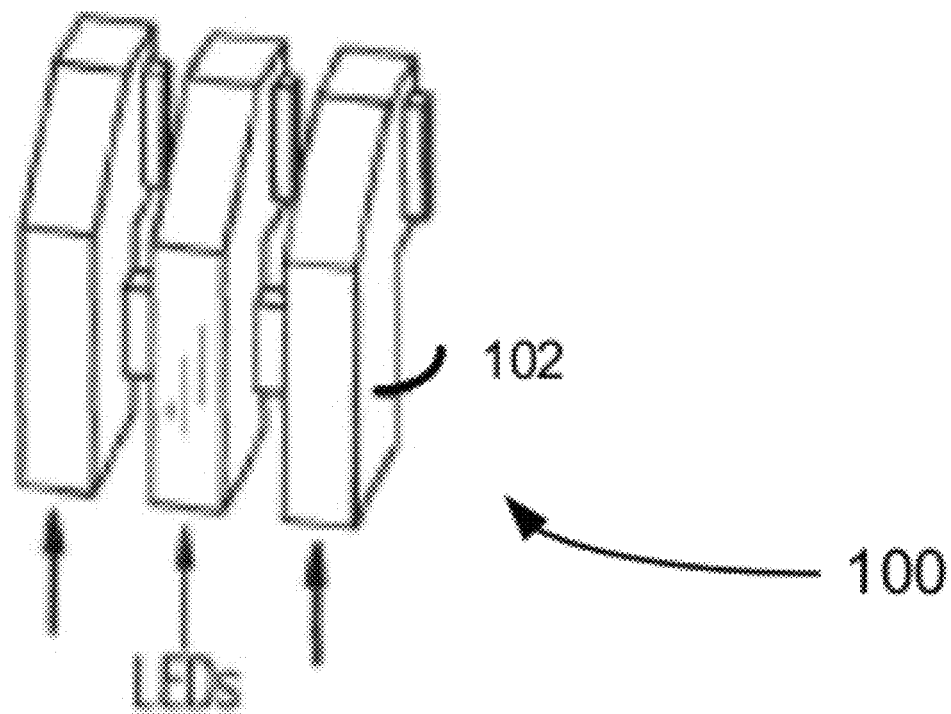
FIG. 1 is a schematic view of a prior art light guide.

As described above, some conventional AFCI circuit breakers include a display that may include one or more visual indicators adapted to provide status and/or operational information associated with the AFCI circuit breaker. As shown in FIG. 1, these conventional indicators may include one or more optical waveguides or light guides 100 that may be coupled to a light source, such as an LED (light emitting diode) associated with one or more circuits and subsystems of the breaker. The light guide 100 may include a number of conduits 102 or pipes commensurate with the number of light sources. The light guide 100 may be adapted to route light generated by one or more fault detection circuits and systems within the breaker to an exterior surface of the breaker for display to an external user. In some embodiments, a conventional breaker may include a groove inside the breaker to receive the light guide 100. After the final assembly of the conventional breaker, a cover may hold the light guide 100 in the groove. However, one problem with conventional breakers with light guides is that during assembly of the breaker, the light guide 100 may slide out of the groove before the cover assembly was secured to the rest of the circuit breaker. For example, when the circuit breaker is being assembled, including the placement of the light guide 100 in the groove, the circuit breaker parts may be transported on a conveyor, for example, down an assembly line. This transportation may be impacted by vibrational forces which may cause the light guide 100 to slide or otherwise fall out of the groove in the breaker. Alternatively, even if the light guide 100 did not fully slide out of the groove, the light guide 100 may become misaligned with the light sources due to the vibrational forces present during assembly. The misaligned light guide 100, if assembled in that condition, may not transmit a desired amount of light, and in some instances may not transmit any light, to the exterior of the circuit breaker. In this instance, the indication that the multi-pole circuit breaker has tripped may not be visually apparent.

The inventors of the present invention have designed an improved light guide. In some embodiments, the light guide includes a snap or retention feature that may secure or retain the light guide to a part of the circuit breaker assembly. In this manner, the secured light guide may be transported on an assembly line without being affected by vibrational forces.

In some embodiments, a first end of light guide conduits of the light guide may each include a light dispersion pad visible on the exterior of the circuit breaker assembly. The light dispersion pad may disperse the light traveling through each light guide conduit for a larger visual indication. In some embodiments, a second end of the light guide conduits, opposite from the first end, may each include a light capture pad. The light capture pad may be positioned closer to the light source than the light dispersion pad, and may have a greater surface projection area than an emitting cross sectional area of the light source. The greater surface area may provide for a more intense illumination and thus more accurate detection of the emitted light intensity. For example, when the light capture pad is the same size as the light source, if the light guide, and therefore light capture pad, is shifted and not directly aligned over the light source, the light guide may not transmit as much light emitted by the light source as possible. In other words, the greater surface area of the light capture pad may capture the emitted light even if the light guide is not directly aligned over the light source. In some embodiments, the light capture pad may also include a tapered or angled surface compared to a longitudinal axis of the light conduit. In some embodiments, the light capture pad may also include a concave, convex or lens shaped surface. This feature may allow a greater surface area to capture and re-direct the light to a user, compared to a light capture pad that is perpendicular to the light conduit.

Figure 2:
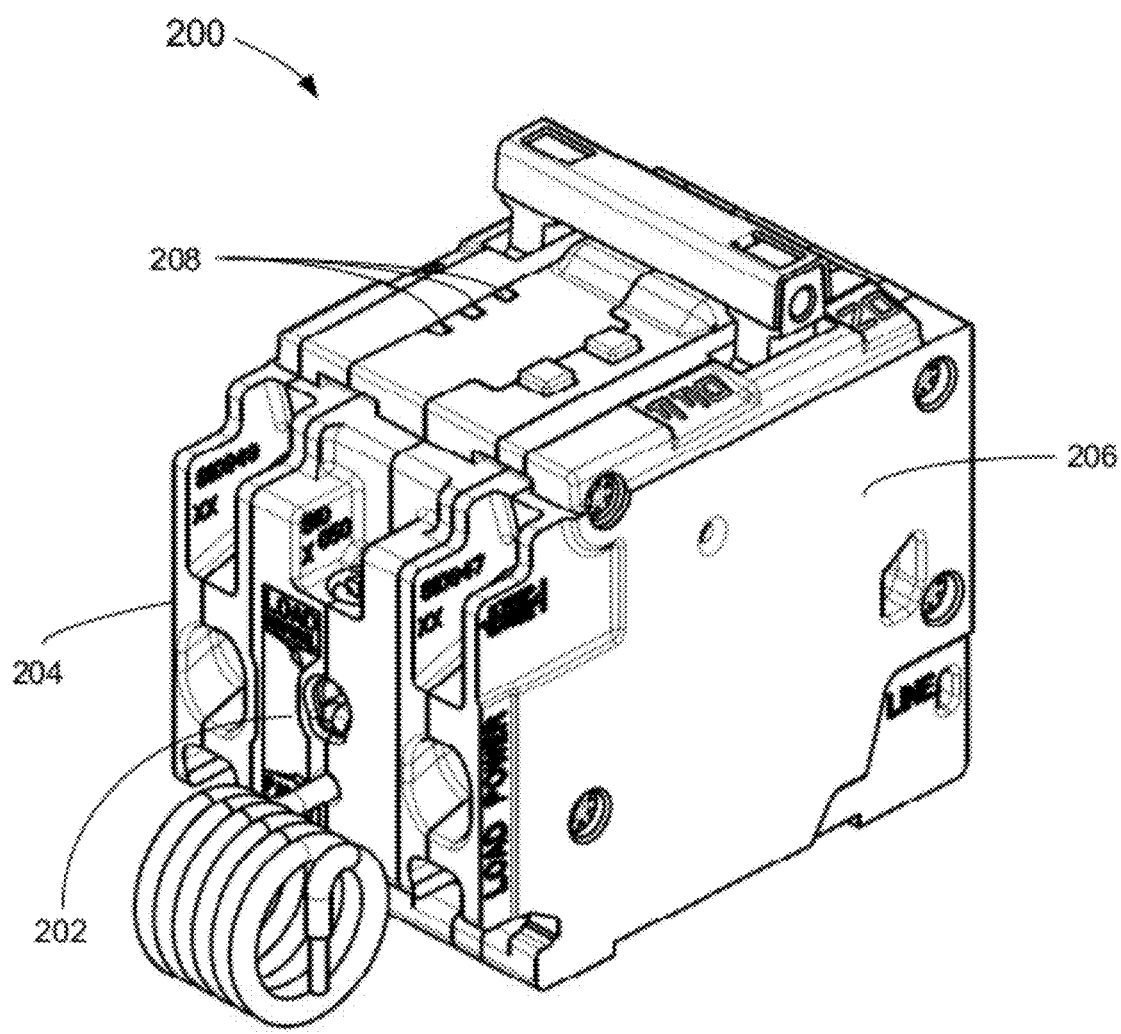
FIG. 2 is a schematic view of an AFCI 2-pole circuit breaker assembly provided in accordance with some embodiments of the present invention.

Turning to FIG. 2, a schematic view of an assembled AFCI 2-pole circuit breaker assembly 200 is provided in accordance with some embodiments of the invention. While the invention shown herein may be described in terms of a two-pole circuit breaker adapted to detect arc faults, it should be understood that the present invention has utility for use in any circuit breaker assembly, which may include one or more circuits and subsystems for implementing processes to detect series and parallel arc-faults, ground faults, and/or differential faults between hot and neutral lines. The circuit breaker assembly may be adapted for use in any residential and/or commercial power system environment and may be configured to detect arc faults, including both line-fault (e.g., parallel-type arcing between lines) and contact-fault (e.g., series-type arcing on the same line due to electrical discontinuity in the conductor), for example, that may be present on a power circuit associated with the power system. The present invention light guide may be used in any type of circuit breaker where multiple indications are desired.

The circuit breaker assembly 200 may include an electronic pole housing 202 and a first mechanism pole housing 204. The circuit breaker assembly 200 may also include a second mechanism pole housing or cover 206. Both the mechanism pole housings 204 and 206 may protect the circuitry housed in the circuit breaker assembly 200. The circuit breaker assembly 200 may also include one or more visual devices, such as a light guide 208, that may provide visual status and/or operational information associated with the circuit breaker assembly 200. The light guide 208 may be illuminated by a light source, described further below, when the electronic circuitry and/or software determine that an arc fault or ground fault condition, for example, has occurred. The light guide 208 may be illuminated when an arc fault is detected on phase A1 (within the first mechanism pole housing 204) or phase B2 (within the second mechanism pole housing 206) of the circuit breaker assembly 200 or a ground fault event has occurred, for example. Other conditions, events and/or status may be detected and indicated, as well.

Figure 3A:
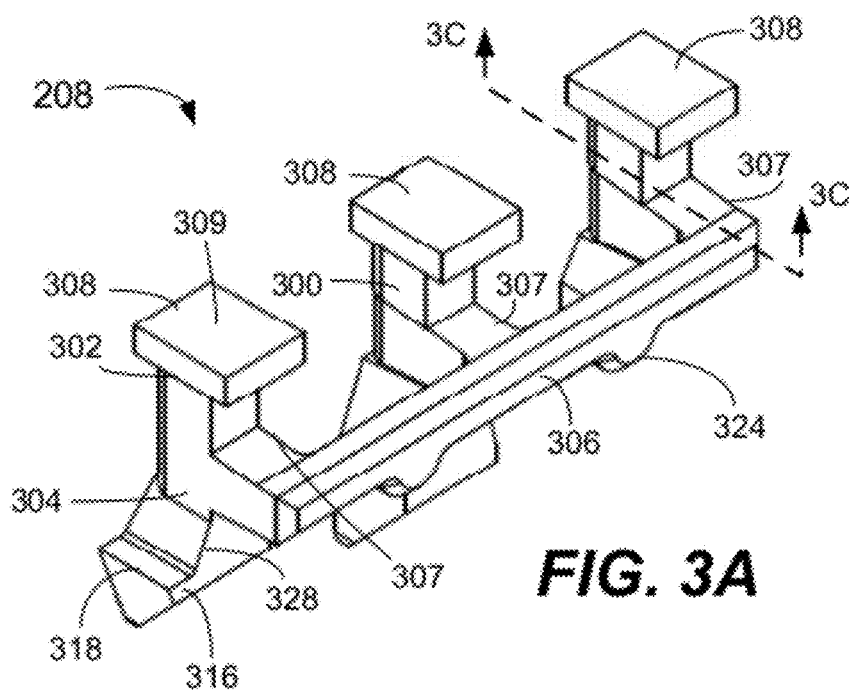
FIG. 3A is a schematic top view of a light guide in accordance with some embodiments of the present invention.
Figure 3B:
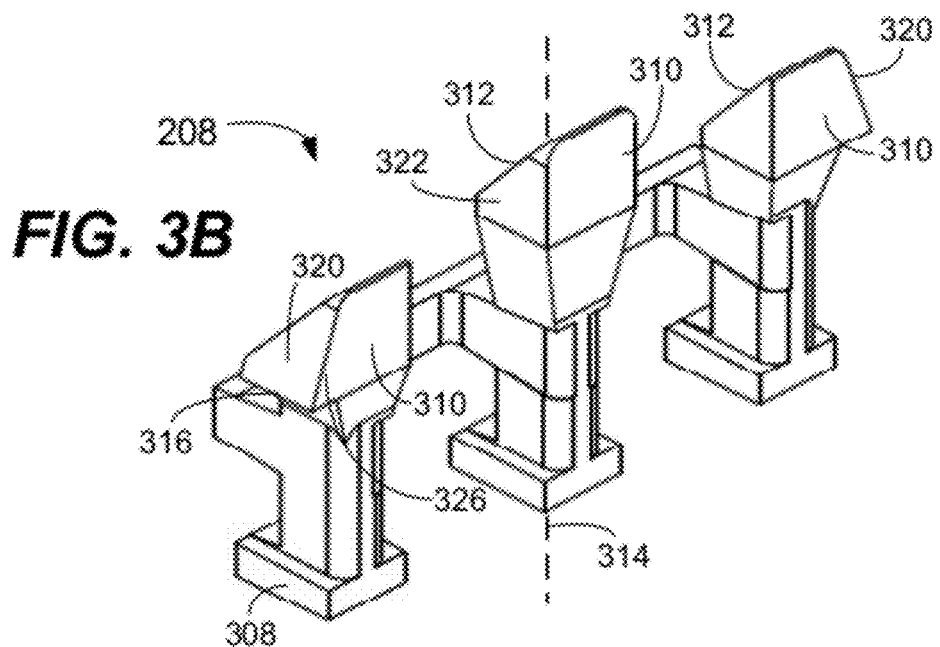
FIG. 3B a schematic bottom view of a light guide in accordance with some embodiments of the present invention.

Turning to FIGS. 3A and 3B, a schematic top and bottom view, respectively, of an exemplary light guide 208 is depicted. The light guide 208 may include one or more light conduits 300, (otherwise sometimes referred to as a light leg), which may transmit light from a light source 600 (described below with respect to FIG. 6) located within the circuit breaker assembly 200 to an exterior of the circuit breaker assembly 200. While the embodiments described herein show conduits with a substantially rectangular cross-section, including a beveled edge 301 (FIG. 3C), any suitable shaped conduits may be used. The beveled edge 301 may be provided for manufacturing purposes. While the embodiments described herein show three light conduits 300, any suitable number of conduits 300 may be used. Each light conduit 300 may be made from a non-conductive, solid and light transmissive material. For example, each conduit 300 may be made from a thermoplastic material, such as GE LEXAN 101™, commercially available from GE Plastics, of Pittsfield, Mass., BAYER APEC 1600™, commercially available from Bayer Material Science of Leverkusen, Germany, LEXAN 124R™, commercially available from SABIC Innovative Plastics Asia Pacific, of China, or any other suitable material. Each light conduit 300 may have a first end 302 and a second end 304, where the first end 302 is opposite the second end 304. The light conduits 300 may be interconnected by a beam 306 or runner. In some embodiments, the transverse width along the beam 306 may be wider at certain locations than the beam 306 at other locations. In some embodiments a connector 307 may be disposed between the beam 306 and the conduits 300 and extend from the conduits 300 to the beam 306 in a direction non-parallel to a central, longitudinal axis 314 of the conduits 300. In some embodiments, the beam 306 may include a cross-bar feature 324 to provide an increased area for labeling parts, and to help dissipate the light transmitted from the light source 600 such that the light emitted from one light source 600, may be prevented from being captured by a non-corresponding conduit 300. For example, in some embodiments, although a negligible amount of light may pass through the beam 306 and the cross-bar feature 324, a majority of the light that passes through the beam 306 may be absorbed by the circuit breaker assembly 200, and the light guide 208 is designed to prevent any significant amount of unabsorbed light in the beam 306 and cross-bar feature 324 to be carried through the light guide 208 to the front of the circuit breaker assembly 200. In some embodiments, the conduits 300 may be integrally formed with the beam 306. In other optional embodiments, the conduits 300 may be formed separately from the beam 306 and coupled thereto by any suitable coupling means (e.g., adhesive, welding, fastener, etc.). The beam 306 may be made of a flexible material with "memory" which may allow the beam 306 to return to its original shape, or substantially to its original shape, after bending or flexing. The flexibility of the beam 306 may facilitate assembly with the circuit breaker assembly 200, as will be further described below with respect to FIG. 8. Additionally, the conduits 300 may also be formed from a flexible material.

Figure 3C:
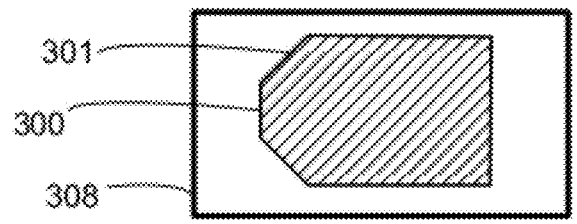
FIG. 3C is a partial cross-sectional view of the light conduit taken along the line 3C-3C in FIG. 3A.

In some embodiments, the first end 302 of the conduit 300 may include a light dispersion pad 308 coupled thereto. While the light dispersion pad 308 shown herein is a pad substantially rectangular in shape, any suitable shape may be used. In some embodiments, the light dispersion pad 308 may be lens shaped to magnify the light and make the visual indication more noticeable. In some embodiments, a cross sectional area or surface area 309 of the light dispersion pad 308 may be larger than a cross section of the conduit 300 (FIG. 3C). For example, in some embodiments, the surface area 309 of the light dispersion pad 308 may be 20-40% larger than a cross section of the conduit 300. Each light dispersion pad 308 may disperse the light transmitted through each corresponding conduit 300 of the light guide 208 near the surface of the exterior of the circuit breaker assembly 200. When the circuit breaker assembly 200 is assembled, as shown in FIG. 2, the light dispersion pad 308 is positioned to be visible from a location adjacent an exterior of the circuit breaker assembly 200 (labeled generically in FIG. 2 as light guide 208). In some embodiments, the light dispersion pad 308 may be substantially parallel to or in the same plane as the exterior of the circuit breaker assembly 200. In other alternate embodiments, the light dispersion pads 308 may be shaped and positioned such that they are non-parallel to or in a different plane (e.g., recessed or protruding) from the exterior of the circuit breaker assembly 200. The light dispersion pads 308 may increase the visibility of the light source 600 (FIG. 6) and may provide users the ability to quickly evaluate which circuit of the circuit breaker assembly 200 generated the arc, ground fault, or other condition.

The second end 304 of each conduit 300 may include a light capture pad 310 coupled thereto. In some embodiments, each of the light dispersion pads 308 and light capture pads 310 may be integrally formed with a corresponding conduit 300. In other embodiments, the light dispersion pads 308 and light capture pads 310 may be formed separately from the conduits 300 and coupled thereto by any suitable coupling means (e.g., adhesive, welding, fasteners, etc.). When the circuit breaker assembly 200 is assembled, the light capture pad 310 may be positioned closer to the light source 600 (FIG. 6) than the light dispersion pad 308. In some embodiments, a surface of the conduit 300 opposite the beam 306 may slope from the light dispersion pad 308 toward the light capture pad 310, to position the light capture pad 310 closer to the light source 600 and capture as much light as possible, as can be seen more clearly in FIG. 7. As can be seen in FIG. 6A, the light capture pad 310 may include a face 312 positioned at a reflecting angle ($\theta$), which may be less than 90 degrees to a longitudinal axis (dotted line) 314 of the conduit 300. In some embodiments, the reflecting angle ($\theta$) may be between 30 and 60 degrees. For example, the face 312 may be positioned at a 45 degree angle to the longitudinal axis 314 of the conduit 300. The angled face 312 may reflect the light received from the light source 600 and direct the light through the conduit 300. In some embodiments the angled face 312 is large enough to accommodate an entire cross-section surface of the light source 600, and collect substantially all of the light emitted therefrom and transfer the emitted light through the light conduit 300. Furthermore, in some embodiments, a surface area of the capture pad 310 may be larger than a cross sectional area of the conduit 300 to which the capture pad 310 is connected. In some embodiments, the surface area may be about 30 to 50%, for example.

A snap or retention feature 316 may be coupled to, or integrally formed with, the second end 304 of the conduit 300. The retention feature 316 is deflectable in operation and may mate with a retention feature interface 602, described further below with respect to FIG. 6. In the embodiment shown in FIGS. 3A and 3B, the retention feature 316 may include a lip 318 protruding from an outer edge 320 of the light capture pad 310. In another embodiment, the lip 318 may protrude from an inner edge 322 of the light capture pad 310 or from the second end 304 of the conduit 300. In other embodiments, the retention feature 316 may be provided anywhere along the conduit 300.

Figure 4A:
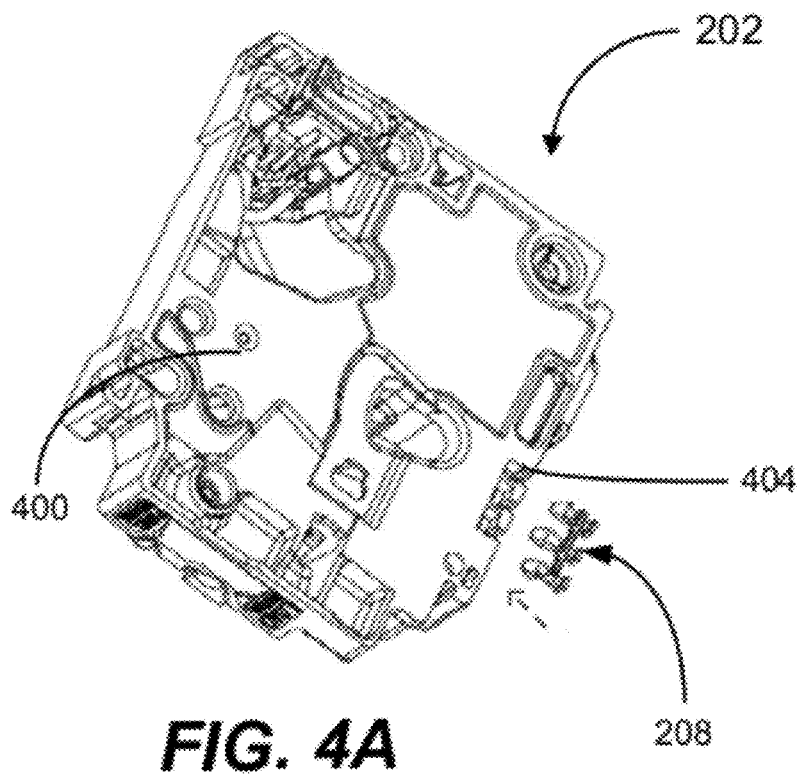
FIG. 4A is a schematic view of a first or front side of the electronic pole housing in accordance with some embodiments of the present invention.
Figure 4B:
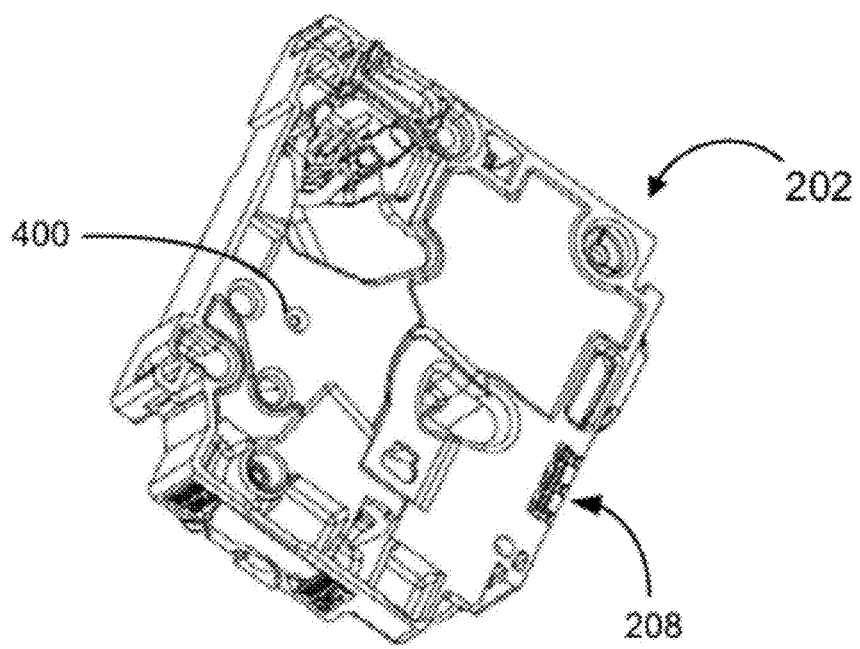
FIG. 4B is a schematic view of the first side of the electronic pole housing after insertion of the light guide in accordance with some embodiments of the present invention.
Figure 5A:
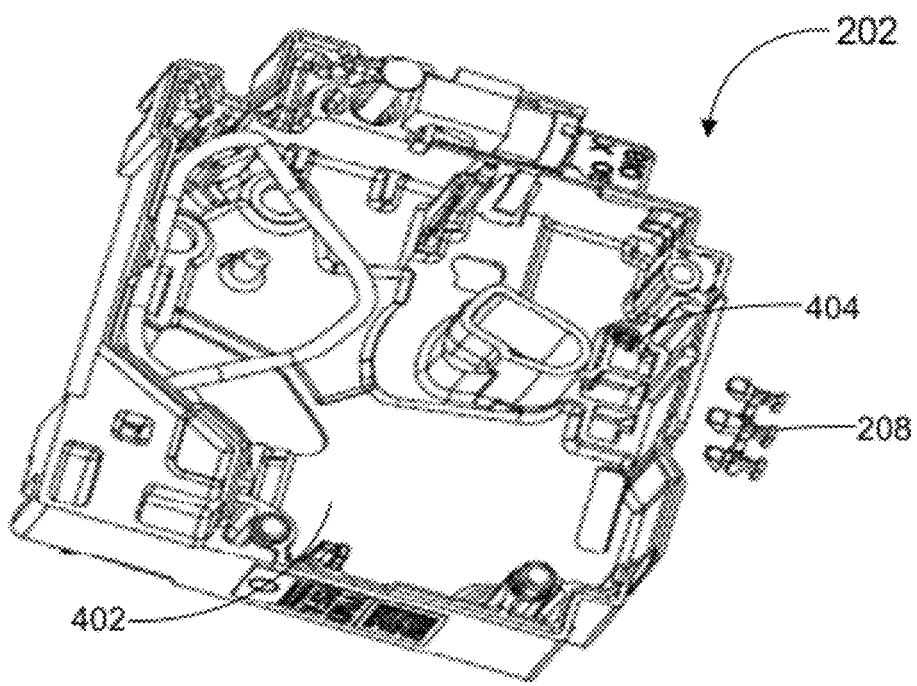
FIG. 5A is a schematic view of a second or back side of the electronic pole housing in accordance with some embodiments of the present invention.
Figure 5B:
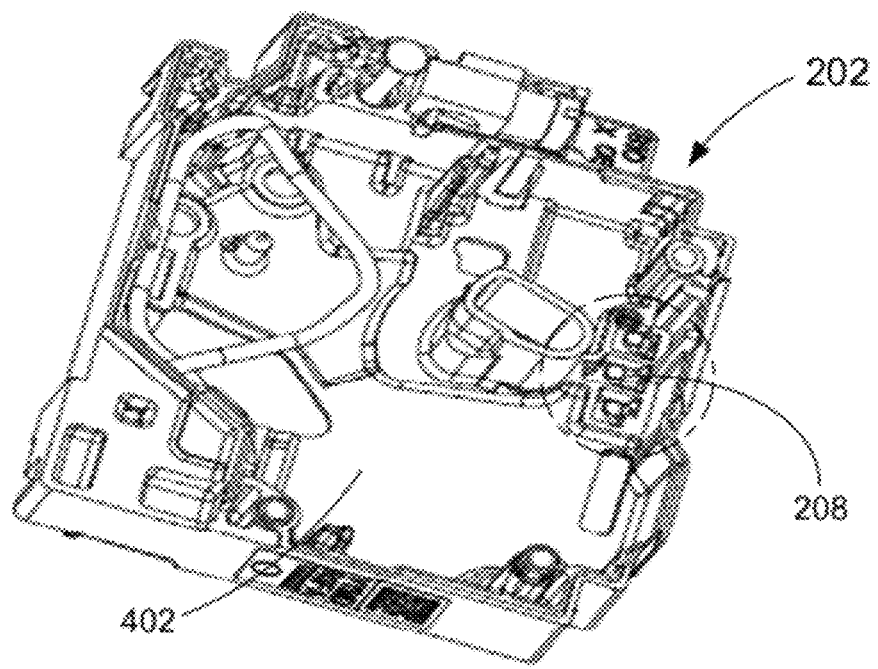
FIG. 5B is a schematic views of the second side of the electronic pole housing after insertion of the light guide in accordance with some embodiments of the present invention.

FIGS. 4A and 5A are schematic views of a first or front side 400 and second or back side 402 of the electronic pole housing 202 prior to receipt of the light guide 208. The electronic pole housing 202 may include one or more openings 404, which may receive the light guide 208, as indicated by the dashed arrow. FIGS. 4B and 5B are schematic views of the first side 400 and second side 402 of the electronic pole housing 202 after the light guide 208 has been inserted.

Turning to FIG. 6, a partial enlarged schematic view of the area within the circle of FIG. 5B is provided. More specifically, FIG. 6 provides an enlarged view of the light guide 208 as installed, and in particular the light capture pads 310, assembled into the openings 404 of the electronic pole housing 202. In some embodiments, the openings may be separate openings 404 for each conduit 300 and light capture pad 310, and may allow the conduits 300 and light capture pads 310 to be isolated from each other by surrounding walls 605. As described above, each conduit 300 may couple with a corresponding light source 600. By isolating the conduits 300 and light capture pads 310 with walls 605, the light emitted from one light source 600, may be prevented from being captured by a non-corresponding conduit 300 and light capture pad 310. This may preserve the light intensity emitted by the light source 600. The light source 600 may be an LED (light emitting diode) or any other suitable light source. The light source 600 may be mounted to the printed circuit board (PCB) 700 (FIG. 7) inside the circuit breaker assembly 200. Each light source 600 may be oriented to project a light beam perpendicular to a longitudinal axis 314 of the light conduits 300. As described above, the light capture pad 310 may be positioned over the light source 600 and may receive the light emitted by the light source 600. In some embodiments, the light source 600 may transmit the light straight to the light capture pad 310 with minimal diffusion, as indicated by the dotted lines between the light source 600 and the light guide 208 in FIG. 6A.

Figure 7:
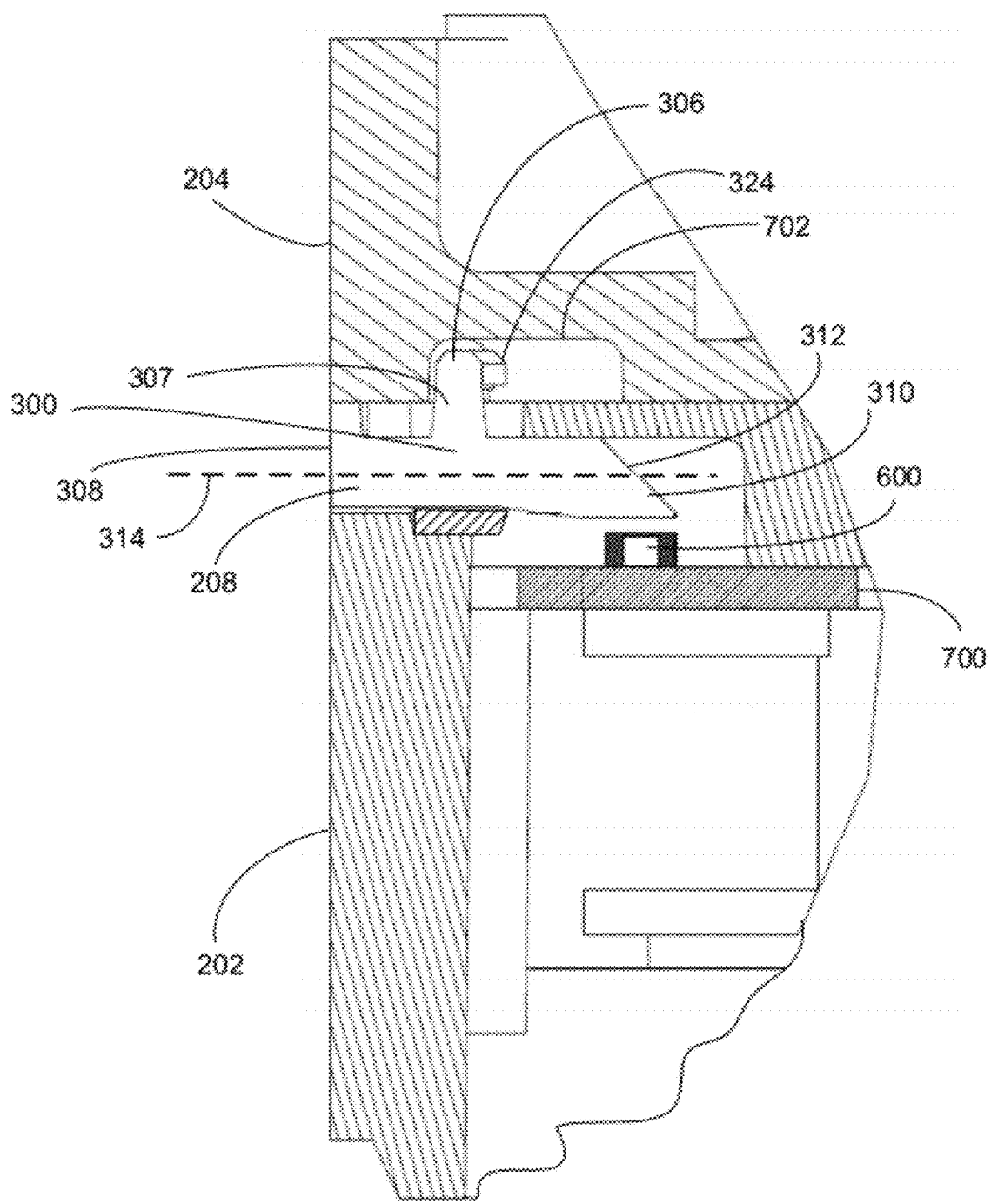
FIG. 7 is a partial side cross-sectional view of the interior of the circuit breaker assembly in accordance with some embodiments of the present invention.

As can be seen in FIGS. 6, 6A and 7, the light capture pad 310 has a greater surface projection area than an emitting cross sectional area of the light source 600. The greater surface projection area may allow for less stringent tolerance control in terms of the positioning of the light guide 208 relative to the light source 600. In other words, even if the light source 600 is shifted during production or assembly, or if the light source 600 and light guide 208 are misaligned, the larger surface projection area may allow for the same amount of light to be captured by the light capture pad 310 and transmitted to the light dispersion pad 308 as if the light source 600 and light capture pad 310 where ideally aligned. If the light capture pad 310 had the same surface projection area as the emitting cross sectional area of the light source and the light source was not properly aligned, the light capture pad may not capture all of the emitted light, which may result in a less intense light external to the housing 202, which may not be easily detectable by a technician.

Again referring to FIG. 6, the electronic pole housing 202 may include a retention feature interface 602. As described above, the retention feature interface 602 may be shaped to engage or mate with the retention feature 316 of the light guide 208, and more specifically a protruding lip 318. For example, the retention feature interface 602 may include a first edge 604 and a second edge 606 of the walls of the opening 404, where the first edge 604 and second edges 606 extend into the opening 404. Once installed, the lip 318 of the retention feature 316 may engage the second edge 606, and may prevent the light guide 208 from being misaligned with the light source 600 or from inadvertently falling out of the electronic pole housing 202 during assembly of the circuit breaker assembly 200.

FIG. 7 is a side schematic partial cross-sectional view of the interior of the circuit breaker assembly 200 in accordance with some embodiments of the present invention. As shown herein, the light guide 208 is secured between the electronic pole housing 202 and the mechanism pole housing 204. In some embodiments, the mechanism pole housing 204 may include a beam capture feature 702, which may be a pocket formed in the mechanism pole housing 204. When the circuit breaker assembly 200 is assembled, the beam capture feature 702 may engage the beam 306 and hold the light guide 208 securely and/or permanently in position. In other words, prior to the mechanism pole housing 204 being coupled to the electronic pole housing 202, the light guide 208 may be removed from the electronic pole housing 202, if further work needs to be done with the circuit breaker, for example.

Figure 8:
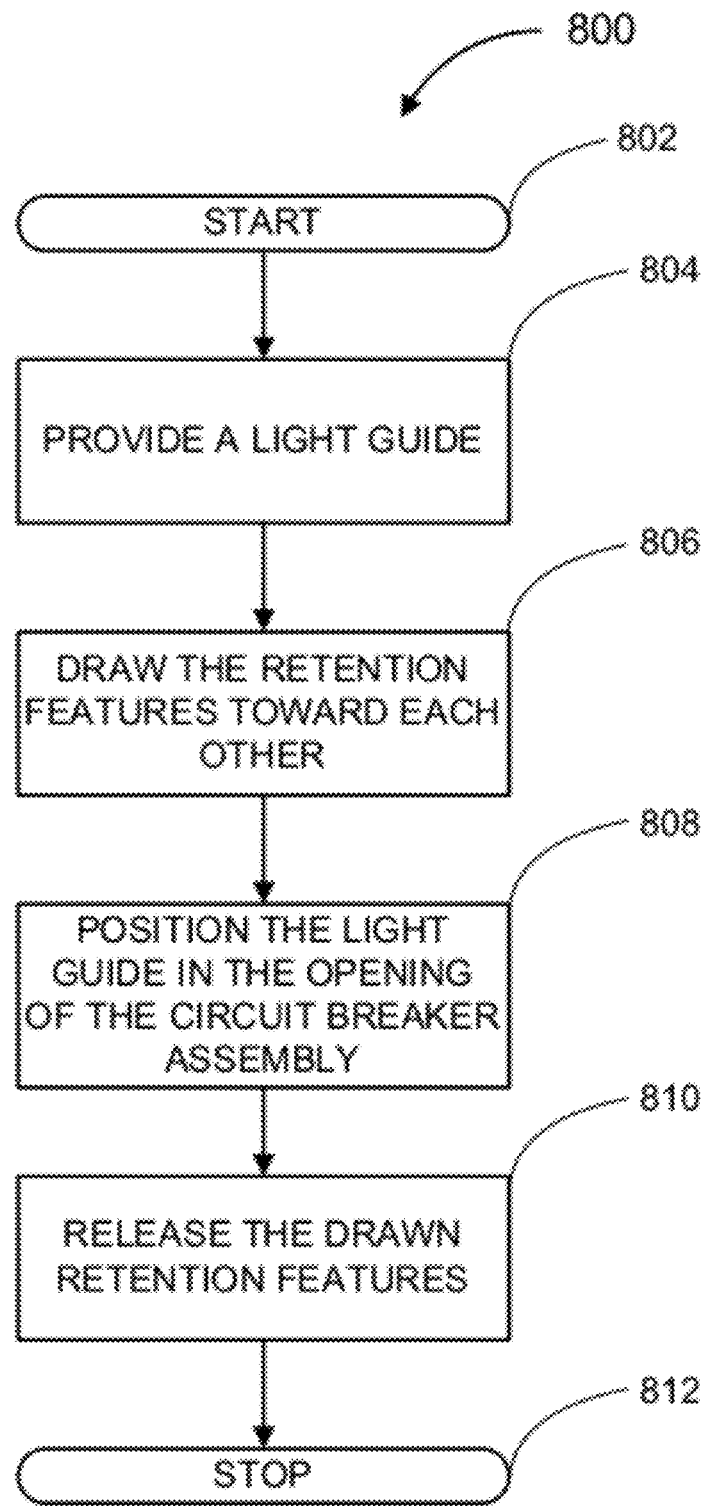
FIG. 8 is a flowchart of an exemplary method for assembling the light guide into the electronic pole housing of the circuit breaker assembly in accordance with the present invention.

FIG. 8 is a flowchart of an exemplary method for assembling the light guide 208 into the electronic pole housing 202 of the circuit breaker assembly 200 in accordance with embodiments of the present invention. With reference to FIG. 8, the method 800 begins at 802. At 804, a light guide 208, as described above, is provided. In 806, the retention features 316 are drawn toward each other such that the beam 306, conduit 300, connector 307, or any combination thereof are bent or flexed. In some embodiments, the beam 306 may be flexed manually or mechanically, or by any other suitable means. In 808, the light guide 208 may be positioned in the openings 404 of the electronic pole housing 202, for example, at approximately a 45 degree angle to the electronic pole housing 202. Other angles may be used in other embodiments. As can be seen in FIGS. 3B and 6, the outer edges 320 of the light capturing pads 310 may include at least a first and second tapered surface 326, 328, respectively, that intersect with surfaces of the conduit 300. The first tapered surface 326 may facilitate positioning the light capturing pads 310 in the opening 404 by acting as an incline. In other words, in some embodiments, when the conduit 300 and the light capturing pad 310 are inserted in the opening 404, the first tapered surface 326 may contact the first edge 602 of the wall 605 of the retention feature interface 602. The contact may cause the beam 306 to deflect or flex when the contact is adjacent the lip 318 to allow the lip 318 to pass the first edge 602 of the wall 605. In some exemplary embodiments, to facilitate compatibility with standard dimensions of existing circuit breaker assemblies, the largest width of the light capture pad 310, including the retention feature 316 may be in the range of approximately 0.025 inches or larger, for example in some embodiments it may be approximately 0.1 inches. Tapering the second surface 328 provides a funneling effect and helps the light transition into the light conduit 300. In 810, the light guide 208 is lifted so that it is substantially parallel to a major surface of the electronic pole housing 202, the lip 318 has moved beyond the first edge 602 of the wall 605, and the drawn retention features are released. As described above, the beam 306 may be made from a flexible material with a memory effect such that the beam 306 self-straightens when released and returns to its original shape. In some embodiments, the beam 306 self-straightens due to strain that builds up in the beam 306 when the beam is in the flexed state. When the retention features are released, the strain may be released and the beam 306 may self-straighten. When the drawn retention features 316 are released, the retention feature 316 engages or mates with the second edge 604 of the retention feature interface 602. In 812, the method 800 ends.

The foregoing description discloses only exemplary embodiments of the invention. Modifications of the above disclosed apparatus and method which fall within the scope of the invention will be readily apparent to those of ordinary skill in the art. For example, the retention features may be positioned along a length of the conduit, such as on a top, bottom, and/or inside surface. In other embodiments the conduits may flex away from each other during insertion into the circuit breaker. In still other embodiments the retention feature may be a tab received in a slot, for example.

Accordingly, while the present invention has been disclosed in connection with exemplary embodiments thereof, it should be understood that other embodiments may fall within the spirit and scope of the invention, as defined by the following claims.

The invention claimed is:

1. A light guide comprising:
a plurality of light conduits adapted to transmit light from two or more light sources within a circuit breaker assembly to an exterior of the circuit breaker assembly, each light conduit having a first end and a second end, wherein the first end is on an opposite end of the light conduit than the second end and wherein the second end is positioned closer to the two or more light sources than the first end;
a beam adapted to connect the light conduits;
a light capture pad coupled to the second end of each light conduit, wherein the light capture pad includes a planar light receiving face and a planar light reflecting face, wherein the light receiving face and the light reflecting face are non-parallel to each other, and the light reflecting face is positioned at a reflecting angle less than 90 degrees to a longitudinal axis of the light conduit; and
one or more retention features coupled to one or more of the light conduits, wherein each retention feature is adapted to mate with a retention feature interface of the circuit breaker assembly.

2. The light guide of claim 1 wherein two or more retention features are coupled to each of the light conduits.

3. The light guide of claim 2 wherein the retention features and the beam are integrally formed with the light conduits.

4. The light guide of claim 2 wherein each light conduit further comprises:
a light dispersion pad coupled to the first end of the light conduit.

5. The light guide of claim 4 further comprising:
connectors adapted to separate the beam from the light conduits,
wherein the connectors extend from each light conduit to the beam in a direction non-parallel to a central axis of the light conduit.

6. The light guide of claim 5 wherein each of the light capture pads and the light dispersion pads are integrally formed with an associated light conduit.

7. The light guide of claim 5 wherein the light capture pad has a greater surface area than an emitting cross sectional area of the light source.

8. The light guide of claim 5 wherein an outer edge of the light capture pad includes at least a first and a second tapered surface that each intersect with the light conduit.

9. The light guide of claim 1 wherein:
each of the retention features includes a lip protruding from an outer edge of the second end of the associated light conduit.

10. The light guide of claim 9 wherein the beam is flexible and adapted to be flexed such that each of the retention features are drawn towards each other during installation into a housing of a circuit breaker assembly.

11. The light guide of claim 10 wherein the beam is adapted to be inserted into the circuit breaker assembly in a flexed position.

12. The light guide of claim 11 wherein the beam is adapted to self-straighten after insertion in the circuit breaker assembly.

13. The light guide of claim 12 wherein each of the lips are adapted to mate with the retention feature interface as the beam straightens after insertion in the circuit breaker assembly.

14. The light guide of claim 1 wherein the at least two light sources are light emitting diodes and each is oriented to project a light beam perpendicular to a longitudinal axis of an associated light conduit.

15. A light guide comprising:
a plurality of light conduits each having a first end and a second end, wherein the first end is on an opposite end of the light conduit than the second end, and wherein the light conduits are adapted to be disposed within a circuit breaker assembly such that the second end is positioned closer to a light source within the circuit breaker assembly than the first end, and wherein the light conduits are adapted to transmit light from the source within the circuit breaker assembly to an exterior of the circuit breaker assembly;
a beam coupled to each light conduit;
a retention feature coupled to the light guide and adapted to hold the light guide within the circuit breaker assembly;
a light capture pad coupled to the second end of each light conduit, wherein the light capture pad includes a planar light receiving face and a planar light reflecting face, wherein the light receiving face and the light reflecting face are non-parallel to each other, and the light reflecting face is positioned at a reflecting angle less than 90 degrees to a longitudinal axis of the light conduit; and
light dispersion pads, each one separately coupled to a different first end of a different one of the light conduits, wherein a cross sectional area of the light dispersion pad is larger than a cross section of the light conduits.

16. The light guide of claim 15 wherein a width of the beam varies along a length of the beam.

17. A circuit breaker assembly comprising:
a housing adapted to house fault detection circuits; and
a light guide coupled to two or more light sources within the housing and adapted to indicate the circuit breaker assembly has been tripped, wherein the light guide includes:
a plurality of light conduits, each having a first end and a second end, wherein the first end is on an opposite end of the light conduit than the second end, and wherein the second end is positioned closer to the two or more light sources than the first end;

a light capture pad coupled to the second end of each light conduit, wherein the light capture pad includes a planar light receiving face and a planar light reflecting face, wherein the light receiving face and the light reflecting face are non-parallel to each other, and the light reflecting face is positioned at a reflecting angle less than 90 degrees to a longitudinal axis of the light conduit;

a beam coupled to each light conduit; and a retention feature coupled to the light guide and adapted to hold the light guide within the circuit breaker assembly, wherein the light conduits are adapted to be disposed within the circuit breaker assembly to transmit light from a source within the circuit breaker assembly to an exterior of the circuit breaker assembly.

18. A circuit breaker assembly, comprising:

a circuit breaker housing;

a plurality of light conduits adapted to transmit light from two or more light sources within a circuit breaker assembly to an exterior of the circuit breaker assembly, each light conduit having a light capture pad with a light receiving face positioned adjacent to a light source, and an internal light reflecting face non-parallel to the light receiving face, the internal light reflecting face being positioned at a reflecting angle less than 90 degrees to a longitudinal axis of the light conduit;

a beam connecting the plurality of light conduits; and one or more retention features adapted to mate with a retention feature interface of the circuit breaker housing.

\* \* \* \* \*